United States Patent [19]

Boetto

[11] 4,336,846
[45] Jun. 29, 1982

[54] AGRICULTURAL FOLDING TOOL BAR

[75] Inventor: Charles Boetto, Naperville, Ill.

[73] Assignee: International Harvester Co., Chicago, Ill.

[21] Appl. No.: 240,747

[22] Filed: Mar. 5, 1981

[51] Int. Cl.³ .............................................. A01B 73/00
[52] U.S. Cl. .................................. 172/776; 172/311; 172/446
[58] Field of Search ............... 172/311, 456, 662, 776, 172/126, 446, 666

[56] References Cited

U.S. PATENT DOCUMENTS

| | | | |
|---|---|---|---|
| 3,692,121 | 9/1972 | Kenney | 172/456 |
| 4,046,203 | 9/1977 | Ward | 172/456 |
| 4,074,766 | 2/1978 | Orthman | 172/311 |
| 4,281,720 | 8/1981 | Tusing | 172/311 X |

OTHER PUBLICATIONS

Cramer, "Favorit-S, Saatbett Kombinationen," Maschinenfabrik Cramer, Ostfriesland, Germany, Sep. 1974.

*Primary Examiner*—Richard T. Stouffer
*Attorney, Agent, or Firm*—J. J. Getchius; F. D. Au Buchon

[57] ABSTRACT

A tool bar having a hollow central section and oppositely extending offset hinged wings movable from a generally horizontally transversely extending working position to a folded transport position. A hydraulic cylinder is positioned in the central section adjacent each wing and has its rod pivotally connected to a pair of rollers substantially spanning the hollow central section and to a pair of links via a slotted connection, with the links also being pivotally connected to the ear of a wing. The rollers reduce wing fall as the wing moves from the working position approximately 180° to a transport position on top of the central section or vice versa. The slotted link connection prevents binding of the rollers against the central section during the procedures.

5 Claims, 6 Drawing Figures

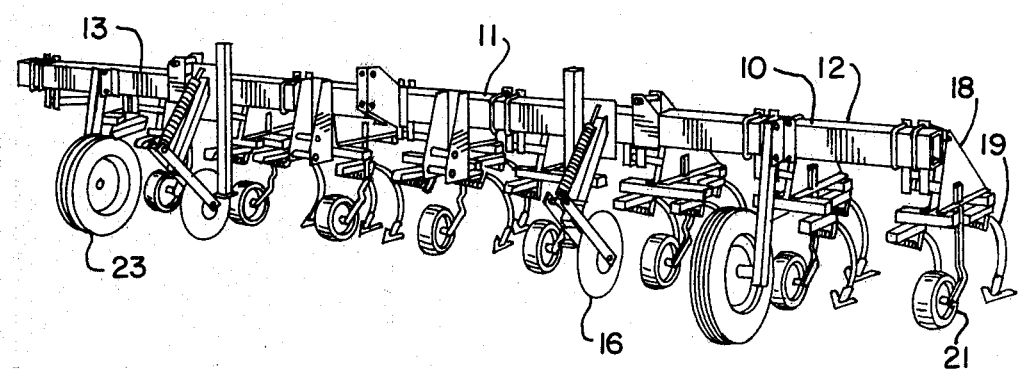
FIG_1_
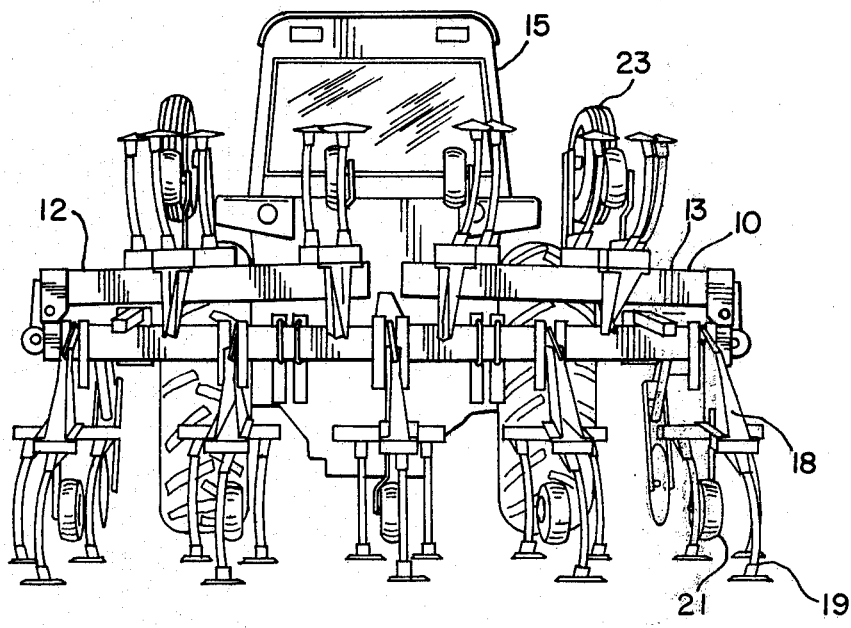
FIG_2_

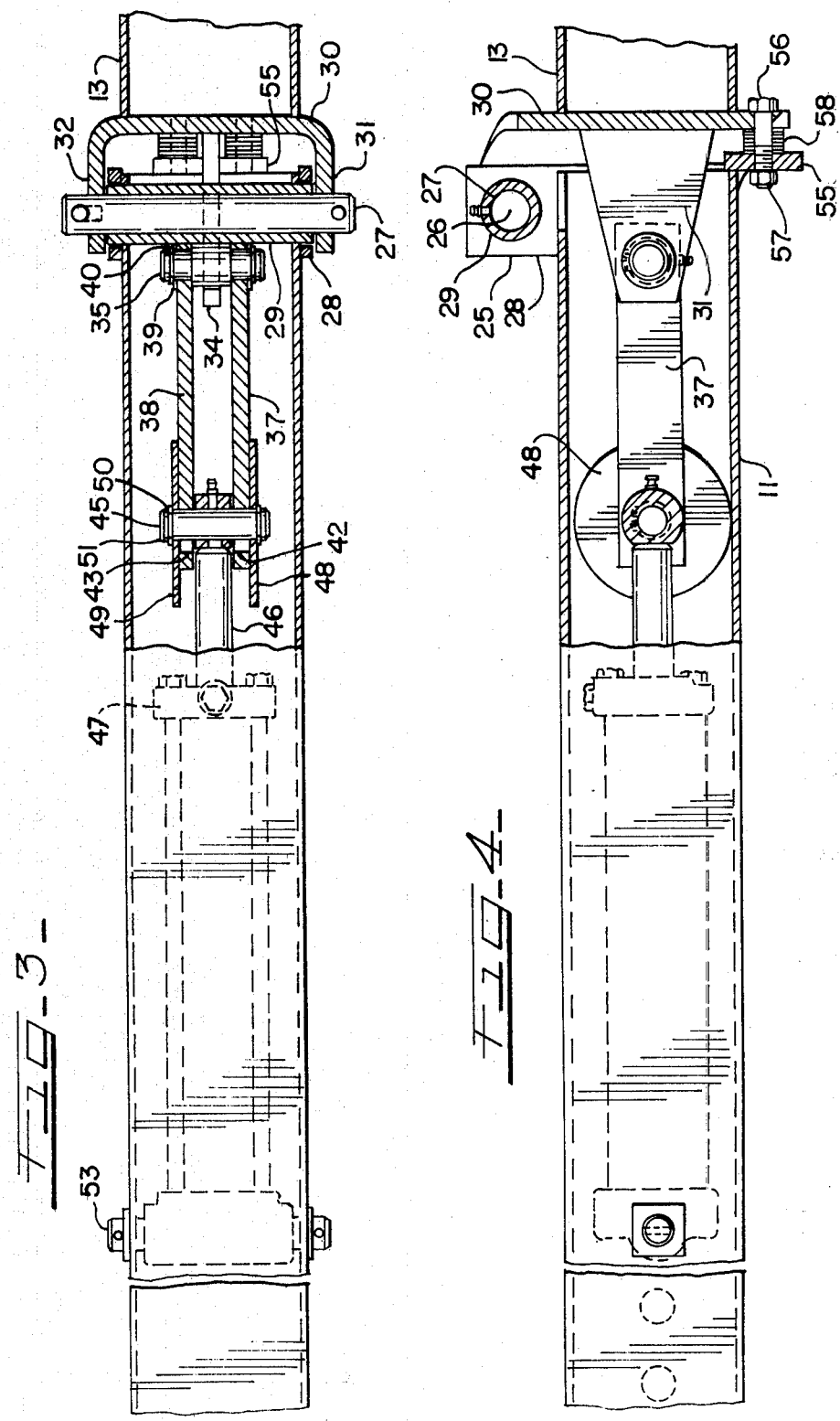

4,336,846

AGRICULTURAL FOLDING TOOL BAR

BACKGROUND OF THE INVENTION

1. Field of the Invention

This invention pertains generally to agricultural tool bars.

2. Description of the Prior Art

Due to the need to mount ground working tools or a tool bar that is foldable from an extended, ground working transverse position to a narrow, transport position, it has become commonplace to install the actuating hydraulic cylinders inside the hollow tool bar rather than on the exterior of same to avoid tool conflict. If a tool bar wing is only to be folded upward about a suitable offset hinge to a position 90° to the central tool bar section, the rod of the cylinder can be connected directly to an ear connected to the wing which is located inside the central section when the cylinder is retracted and the wing section is in the working position. However, if it is desired to fold the wing approximately 180°, so same lies on top of the center section in the folded position, additional structure is needed. This structure may include an additional pair of links pivotally connected to the end of the cylinder rod and a pair of rollers also similarly connected to the cylinder rod. The other ends of the links are pivotally connected to the ear rigidly connected to the associated wing. An additional fulcrum, generally adjacent the hinge, may be provided for contact by the links when the wing is moving in the inner, overcenter of the hinge pivot position. The rollers generally provide support for the cylinder rod under the wing weight and maintain same and the cylinder in a horizontal position even where the base end of the cylinder is pivotably mounted to the central tool bar section.

The above structure does provide the 180° folding capability desired, but the wing is not well controlled as it moves over the hinge pivot to the folded and unfolded positions. Specifically, the rollers in the past have not been carefully sized to the interior tool bar dimensions and move substantially up and down between the upper and lower walls during the process with attendant wing fall. If the rollers are carefully sized to the interior tool bar dimensions to minimize wing fall they bear too tightly, for example, against the top wall on folding, and the folding cannot be completed. Thus, wing fall is controlled, but the design is not workable.

SUMMARY OF THE INVENTION

Applicant, as a consequence, designed a folding tool bar wherein wing fall is substantially eliminated even when same is folded 180°. Specifically, Applicant utilizes the upper offset hinge pivot tube or sleeve of the central tool bar to the wing as a fulcrum (by cutting away a portion of the upper wall of the central tool bar) for the links when the wing is inwardly over center of the hinge pivot. Applicant further sizes the rollers to substantially extend between the upper and lower walls to minimize the tendency of the rollers to touch one wall and then the other during the folding process. Also, to prevent the binding tendency of the rollers in regard to the walls as the wings inwardly move over the hinge pivot, Applicant provides a slotted connection between the links and the cylinder rod end to provide the needed clearance—and no more—for the entire folding and unfolding sequence to achieve his new and surprising result. No other lost motion connections are utilized.

To provide a rigid non-flex of the wing in the horizontal working position if desired, Applicant tailors the stroke of the cylinder so that same is not completely retracted in the working position to take up the slotted link clearance and to maintain the wing tightly against the central section via an adjustable stop on the wing. If flexing or float of the wheel supported wing in regard to the central section is desired so same can follow the land contour, Applicant reverses the stop and the cylinder rod pulls the wing downwardly from the horizontal position against the central section also taking up the slotted link clearance. By placing a conventional valve in the open, center position, the wing can float upward and downward from the horizontal position by pumping the cylinder. Of course, by suitable hydraulic controls the wing can be folded to intermediate positions for contour working.

It is, therefore, an object of this invention to provide a new and improved folding tool bar.

Another object of this invention is to provide a tool bar that folds approximately 180°.

Another object of this invention is to provide a folding tool bar wherein a wing can flex upwardly and downwardly from the horizontal working position.

BRIEF DESCRIPTION OF THE DRAWINGS

FIG. 1 is a perspective front view of the tool bar in the working position;

FIG. 2 is a rear view of the tool bar in the folded transport position;

FIG. 3 is an enlarged plan view of a portion of the tool bar with the wing in the rigid working position;

FIG. 4 is a rear view of the tool bar of FIG. 3;

DESCRIPTION OF THE PREFERRED EMBODIMENT

Figure 5:
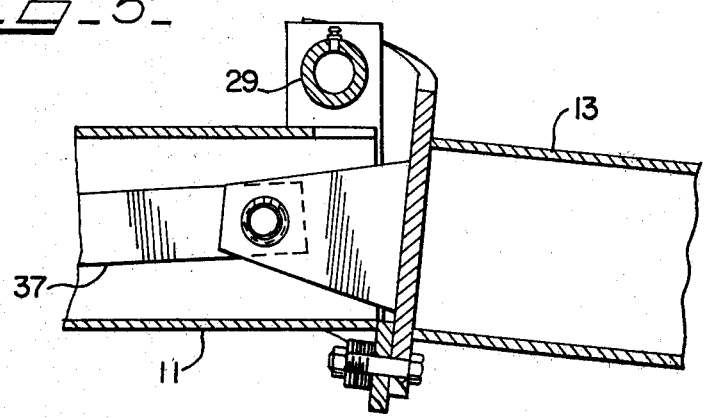
FIG. 5 is a view similar to FIG. 4 of the wing in the flex working position.

Referring to FIGS. 1 and 2, 10 indicates an agricultural folding tool bar. Tool bar 10 includes central section 11 and preferably left wing 12 and right wing 13 pivotally mounted on opposing ends. The hand of the wings is determined when standing to the rear of the tool bar 10, and looking toward the tractor 15 shown in FIG. 2.

As shown in FIG. 1, central hollow section 11 is equipped with suitable brackets for a three point hitch and spring loaded guide fins 16 to prevent wandering during high speed operation. Tool bar 10 (as shown) is also equipped for cultivator usage with spaced gangs 18 of adjustable spaced spring loaded shanks 19 having sweeps. Each gang is connected to the tool bar by a parallel bar linkage 20 (also see FIG. 6) supported by an adjustable gauge wheel 21 for uniform depth cultivation. For a more complete understanding of gang 18, U.S. Pat. No. 3,921,726 granted Nov. 25, 1975 for Cultivator Having Plurality of Laterally Adjustable Tool-Supporting Beams, should be consulted. Also shown in FIG. 1, are adjustable carrying wheels 23 for each wing to help gauge the wings 12 and 13. Conventional rolling shields, not shown, may be mounted on the tool bar 10 when desired in the cultivating operation.

The folding arrangement for the wings from the ground working position of FIG. 1 to the transport position of FIG. 2 is shown best in FIGS. 3-6. Only the connection of right wing 13 to the central section 11 is shown, since both wings are similarly connected to the central section. Also, as noted in FIGS. 1 and 2, the location of the hydraulic cylinder inside the tool bar is required for optimum spacing of the cultivator gangs to the tool bar.

Referring to FIGS. 3-6, wing 13 is pivotally connected to section 11 by hinge 25 about offset axis 26 defined by shaft 27. Hinge 25 includes spaced plates 28 welded to each lateral side of section 11 and extending above same. Sleeve 29 extends between plates 28 above section 11 and is welded therebetween to provide a bearing for shaft 27. Sleeve 29 also provides a fulcrum for the later to be described links because of a cut out portion 29a in the upper wall of central section 11. Bracket 30 is welded to the open end wing 13 and closes same forming an open channel having spaced walls 31 and 32 which encloses plates 28. Shaft 27 extends outward of sleeve 29 and via suitable apertures extends through the channel walls. Via a cotter pin and washers at one end (not shown) and a locking pin 33 extending between the other end of the shaft 27 and wall 31, shaft 27 is releasably mounted in hinge 25.

Also a part of wing 13 and rigidly mounted on the central portion of bracket 30 and midway between walls 31 and 32 is bar 34. Bar 34 has shaft 35 rigid therewith and extending on both sides thereof. Bar 34 and shaft 35 extend into the interior of central section 11 in the working position when section 11 and wing 13 are substantially aligned. Shaft 35 provides a pivotal mounting to longitudinal links 37 and 38 on each side of bar 34 via washers 39 and snap rings 40 extending into suitable grooves in shaft 35. Suitable lubrication fittings may be provided as shown in links 37 and 38 for shaft 35 as well as for shaft 27.

Links 37 and 38 are pivotally connected via axially slotted holes 42 and 43 respectively with a clearance of 44" to 1.25" Dia shaft 45 extending therethrough and also through an opening through the end of rod 46 of double acting hydraulic cylinder 47. Also pivotally connected to shaft 45 are 6.30" Dia rollers 48 and 49 located adjacent to links 37 and 38 respectively and movable in central section 11 which has an inner vertical dimension of 6.50". Washers 50 and snap rings 51 releasably maintain the elements noted on shaft 45. A suitable lubrication fitting may also be provided in the rod end 46 for shaft 45. Cylinder 47 at the end remote from the rod 46 is pivotally mounted inside section 11 by shaft 53 extending through the side walls of section 11 and maintained therein by suitable washers and cotter pins (not shown).

Primarily to provide for (float) flex or non-flex operation (and shown best in FIGS. 3, 4 and 5), Applicant provides block 55 that is releasably attached to bracket 30 between walls 31 and 32 below bar 34 by spaced bolts 56 and nuts 57. A plurality of washers 58 by their mounting position on the bolts alternately place one side of block 55 against the lower wall of section 11 for a substantially horizontally aligned section and wing position and on another side for a downwardly extending wing position. In the horizontal aligned position of FIG. 4, with the cylinder rod 46 retracted, but short of the fully retracted position, the block and therefore the wing is held rigidly against the central section with the clearance of the links slotted holes being taken up by the remaining stroke of the cylinder. Thus, the wing cannot float or flex up or down and is held rigid by the cylinder. Reversing the washers and with the cylinder retracted, the cylinder brings the other side of the block 55 into contact against the lower wall of section 11 with the wing now inclined downwardly (see FIG. 5). The clearance of the link slotted holes is also eliminated. If the conventional valve is moved to its open center position, the wing can flex upwardly an unlimited amount as the wing wheel follows the ground contour and downwardly until the other side of the block contacts the central section by pumping the cylinder.

Figure 6:
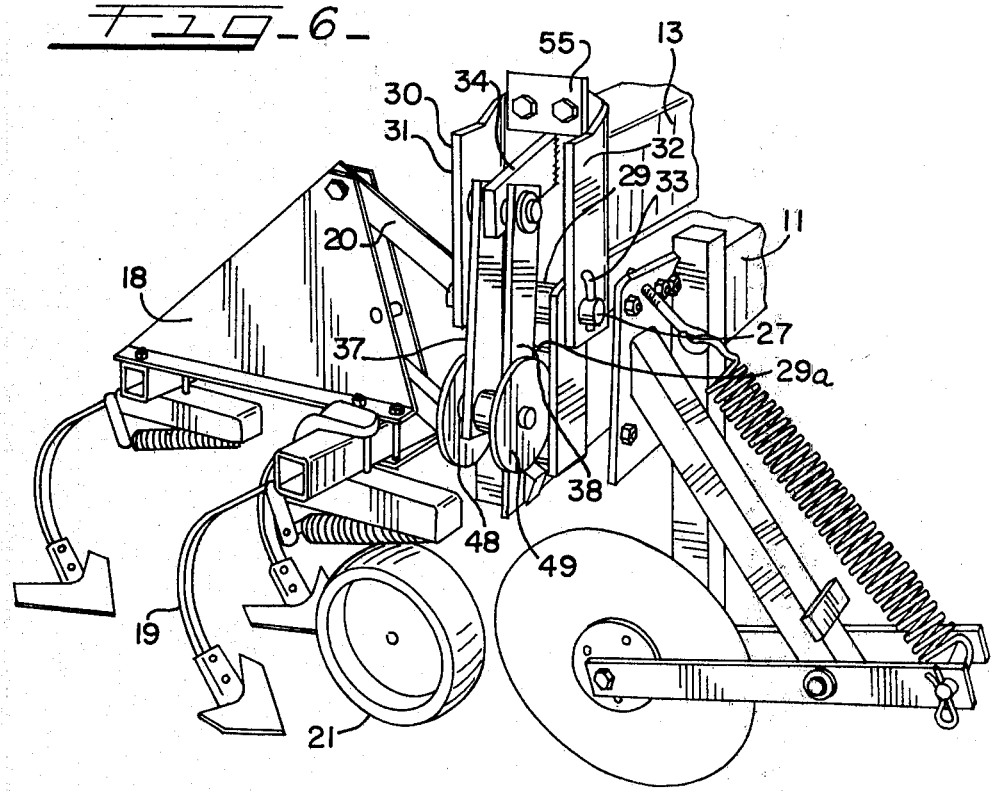
FIG. 6 is an enlarged partial perspective view of a wing of the tool bar in the folded transport position.

In Operation, and as shown best in FIGS. 3 and 6, as the cylinder rod 46 is extended to fold the wing the links 37 and 38 are forced toward the open end of section 11 supported by rollers 48 and 49 and the wing pivots upwardly about axis 26. The links axial slot clearance is initially as shown in FIG. 3. As the wing moves over the axis 26, the wing will have a tendency to fall inward bringing links 37 and 38 against sleeve 29 which acts as a fulcrum, and also bringing the rollers against the upper interior surface of section 11. Since substantially of the same size, the rollers will only lightly contact the upper inner wall without binding because the axial slotted clearance of 44", now utilized will allow the wing to continue moving to the fully folded position which may be 180° or more. By the careful sizing of the rollers to the inner dimensions of section 11 and providing only the needed link slotted clearance, the folding is accomplished smoothly with little loss of control.

When the cylinder is retracted, and the wing moved from the folded position of FIG. 6, the axial slot clearance is vertical to the cylinder rod and thus this clearance is not taken up allowing the wing to move to the position over the axis via the fulcrum 29 without binding of the rollers against the upper inner wall of section 11. As the wing passes over center, the wing has a tendency to fall outwardly and would force the rollers tightly against the bottom of wall 11. Here the axial slot clearance of the links relieves the binding of the rollers and the sized rollers reduce the wing fall as the wing moves to the working position. Thus the elements are so constructed to achieve the entire sequence successfully.

What is claimed is:

1. A folding tool bar adapted to support ground working tools and comprising:
   (a) a normally horizontal, hollow central section;
   (b) an outer wing section pivotally connected to said central section about an offset axis for movement between a working position in general alignment with said central section and a folded transport position that lies on said central section, said pivotal connection being located above an end of said central section and adjacent thereto and providing a fulcrum for a portion of said movement;
   (c) a hydraulic cylinder including a cylinder rod defining a rod end for said cylinder on the distal end thereof mounted in said inner section;
   (d) a pair of rollers pivotally mounted to the rod end of said hydraulic cylinder and substantially spanning the interior of said central section; and
   (e) a pair of links pivotally connected to said rod end by a shaft slidable in axially elongated slotted openings, said openings providing substantial clearance in said axial direction for said shaft said wing having an ear, said ear being pivotally connected to said links, said links upon cylinder activation, moving said wing upward until said wing passes inwardly over center of said axis and said links move into contact with said fulcrum and pivot thereabout as the wing moves to the transport position, said rollers and said fulcrum reducing wing fall and said links slotted connection relieving roller binding in said central section in the movement between working and transport and vice versa, said wing section being so positioned relative to said central section and said slotted openings being sufficiently small that clearance of said slotted openings is taken up by said hydraulic cylinder, and said wing section is held rigidly against said central section by said hydraulic cylinder, when said hydraulic cylinder is in its retracted condition and said wing section is in said working position.

2. The tool bar of claim 1, in which said links are elongated and said slotted openings are in said links.

3. The tool bar of claim 2 in which said hydraulic cylinder is pivotally mounted in said central section.

4. The tool bar of claim 3 in which each of said links is mounted on opposing sides of said rod and each of said rollers is mounted adjacent a link of said pair of links.

5. The tool bar of claim 4 further comprising an adjustable stop on said wing section for contact with said lower wall of said central section to vary the inclination between the wing and central section in the working position.

* * * * *